United States Patent [19]
Bachmann et al.

[11] 3,838,786
[45] Oct. 1, 1974

[54] CAPACITOR DISCHARGE BOLT WELDING SYSTEM

[75] Inventors: Gerhard Bachmann, Feldkirch Tosters, Austria; Karl Max Harder, Vaduz, Germany

[73] Assignee: Hilti Aktiengesellschaft, Schann, Furstentum, Liechtenstein

[22] Filed: July 30, 1973

[21] Appl. No.: 384,018

[30] Foreign Application Priority Data
Aug. 4, 1972 Germany............................ 2238538

[52] U.S. Cl. ................................. 219/98, 317/60 A
[51] Int. Cl............................................. B23k 9/20
[58] Field of Search ............... 219/98, 99; 317/60 A

[56] References Cited
UNITED STATES PATENTS
| | | | |
|---|---|---|---|
| 3,414,700 | 12/1968 | Glorioso | 219/98 |
| 3,522,409 | 8/1970 | Fay et al. | 219/98 |

Primary Examiner—J. V. Truhe
Assistant Examiner—Clifford C. Shaw
Attorney, Agent, or Firm—Toren, McGeady and Stanger

[57] ABSTRACT

In the system disclosed, a capacitor bank which stores welding energy is rechargable by a power source. A welding current switch closes the welding circuit with welding electrodes in response to a trigger that opens the charging circuit and completes the discharging circuit. A safety circuit responds to a welding electrode voltage higher than a predetermined value and to the fact that the trigger has not completed the welding current circuit to discharge the capacitor bank, and cuts the bank off from its power source. A monitor circuit is automatically actuated between welding cycles and causes the safety circuit to be actuated. The monitor circuit permits recharge of the capacitor bank at most to a non-hazardous voltage level as long as the safety circuit does not become operative. The safety circuit is connected to the monitor circuit so that the safety circuit, after having been actuated, allows the monitor circuit to return to its rest position. The safety circuit, following the return to the rest position of the monitoring circuit, similarly returns to its rest position unless a voltage higher than the predetermined voltage exists between the welding electrodes.

14 Claims, 5 Drawing Figures

CAPACITOR DISCHARGE BOLT WELDING SYSTEM

BACKGROUND OF THE INVENTION

This invention relates to capacitor discharge bolt or stud welding apparatuses, and particularly to such apparatuses which incorporate a safety cutoff system.

Such apparatuses generally utilize a capacitor bank that can be charged from a power source as the storage for the welding energy. To make the welding energy available, the capacitor is charged to a voltage of about 100 to 200 volts.

For the purpose of performing the welding operation, the power source is disconnected from the capacitor bank by actuating a manual switch. A triggering circuit responds to the manual switch and in turn actuates a welding current switch. The latter allows a very high surge current of several thousand amperes to flow in the welding circuit. After intensive use of the stud welding apparatus for an extended period, it is possible for the welding current switch to stop operating properly. As a result, the full voltage of the capacitor bank may continuously appear at the welding electrodes.

As a rule, a thyristor with control electrodes serves as a welding current switch. As a result of heavy use, the thyristor may remain conductive after performing a welding operation. In that case, the following recharge of the capacitor bank, the full voltage of 100 to 200 volts appears at the welding electrodes.

Capacitor discharge stud welding systems normally involve a welding gun having holding means that hold an element, such as a bolt to be secured by welding to a given base material. Generally, the element has a forwardly projecting tip, which reaches the base material ahead of the remainder of the element when the element is moved toward the base material. The initial current surge from the capacitor battery vaporizes the tip and initiates an arc that forms a welding pool in the base material. The bolt or stud is then plunged into the welding pool and the energy in the bank disipated so that the pool can solidify.

When an operator inserts the appropriate holding mean and the element in a welding gun, one of his hands necessarily contacts one of the two electrodes. If the operator then accidentally contacts the other electrode, such as the base material to which the element is to be secured by welding, the operator may be exposed to a voltage of 100 to 200 volts if the welding current switch fails.

Safety circuits for preventing such conditions are known. One such safety circuit is connected with the overall operation of the bolt welding device so that when a voltage exceeds a non-hazardous voltage or which is higher than a protective voltage allowed by local codes accidentially occurs between the welding electrodes the safety circuit will discharge the capacitor bank either completely or to a harmless voltage. Such a harmless voltage may be 25 volts or less as permitted by local code. The safety circuit simultaneously disconnects the capacitor banks from its power source.

Such a safety circuit offers reliable protection for an operator as long as it works perfectly. However, the safety circuit may become inoperative in the event of problems which may be caused by defective components or a defective conductor. The operator has no way of detecting this inoperable condition directly. Thus, the operator may feel safe for weeks and even months until subsequent servicing of the device without actually being safe. This may be more dangerous than operating with known hazards. Defects resulting in malfunction of the safety circuit are relatively improbable. However, on account of the potential and very serious consequences, the occurence of a malfunction of the safety device must be prevented with maximum reliability.

An object of the present invention is to improve capacitor stud welding apparatuses of the types described above.

Another object of the invention is to avoid the aforementioned problems.

Still another object of the invention is to provide a capacitor discharge stud welding device in which the recharge of the capacity battery is reliably prevented in response to breakdown of the safety circuit.

SUMMARY OF THE INVENTION

According to a feature of the invention, these objects are obtained in whole or in part, by automatically actuating a monitoring circuit between welding cycles and causing the safety circuit to be actuated, having the monitor circuit permit recharging of the capacitor bank at most up to a harmess voltage level as long as the safety circuit fails to operate following actuation of the monitor circuit, connecting the safety circuit with the monitor circuit in such a way that the safety circuit allows the monitor circuit to return to its rest condition after the safety circuit has become operative, and having the safety circuit likewise return to its rest condition following return of the monitor circuit in to its rest condition unless a voltage exceeding a preset voltage exists between the welding electrodes.

The monitor circuit creates conditions bound to actuate the safety circuit. Thus, operation of the safety circuit can be effectively checked. At the same time, it is possible to prevent occurrence of a hazardous voltage between the welding electrode in the event of a breakdown of the safety circuit.

According to a feature of the invention the monitor circuit is activated only at intervals greater than an integral number of welding cycles.

According to another feature of the invention the monitor circuit is activated between all welding cycles. Thus, a monitor cycle is performed after every welding cycle, during which the welding current switch is always subjected to heavy stress.

According to another feature of the invention the monitor circuit is activated at greater intervals such as every fifth welding cycle.

According to yet another feature of the invention the monitor circuit is activated after every second cycle.

According to another feature of the invention the monitor circuit does permit recharging of the capacitor battery upon determing a defect of the safety circuit. However, this recharge is limited to a voltage level less than a predetermined safe voltage such as that prescribed by the local codes, for example, 25 volts.

According to another feature of the invention the safety circuit and monitor circuit are coupled by electro magnetic relays.

According to still another feature of the invention the monitor device prevents recharging of the capacitor bank completely as long as the safety circuit fails to operate after the monitor circuit has been activated.

According to another feature of the invention, depending upon the degree of safety desired, various events in the operating cycle of the stud welding machine or certain actuating procedures of the machine are used to activate the monitor circuit. According to one feature the monitor device is activated immediately after every welding cycle. For this purpose the actuating event is removal of the welding gun from the base metal following a welding cycle by cutting the electrical connection between the gun and the base metal as a result of removing the gun.

According to another feature of the invention, the monitor circuit responds to every charge of the capacitor bank.

According to another feature of the invention, the monitor device is also actuated in response to every connection of the stud welding apparatus to the current supply line. This provides additional security.

According to another feature of the invention, the monitor device is actuated by any known pulse generating circuit actuated upon connection of the stud welding apparatus. A pulse is emitted in the process.

According to another feature of the invention, the pulse generating circuit is a capacitor whose charge current actuates the monitor circuit upon connection of the stud welding machine to the line. This has the advantage of particularly low cost.

According to another feature of the invention, a discharge resistor is connected in parallel with the capacitor. The resistance of the resistor is low enough to permit prompt adequate discharge of the capacitor following disconnection of the stud welding machine from the line to restore operation readiness of the capacitor. On the other hand, the resistance level is high enough to prevent unnecessary loss of power as a result of current reversals.

According to another feature of the invention, the monitor circuit keeps the power source disconnected from the capacitor bank from the moment of its activation until the operation of a safety circuit. This prevents the capacitor battery from being recharged prior to a complete performance of the monitoring cycle.

According to another feature of the invention, the triggering circuit comprises a bistable switching means for triggering the welding current switch and for separating the power source from the capacitor bank. The means, following the input of the first pulse, actuates closing of the welding current switch and disconnects the power source from the battery. Following a second pulse, the means resumes its original switching state. The first pulse is generated by the triggering circuit and the second pulse by actuation of the safety circuit. Furthermore, the bistable switching means allows the safety circuit to return to its rest position following the second pulse.

If a hazardous voltage exists between the welding electrodes and closing of the welding current switch is not triggered by the triggering circuit, the safety circuit will of course not return to its rest position following the second pulse. Rather it will retain its operating condition for the purpose of performing its safety function.

According to another feature of the invention, a pulse generating device automatically supplies a brief current pulse to the bistable switch means upon connection of the maching to the line. This current pulse constitutes the first pulse. As a result of this first pulse, the switching means trips the welding current switch and disconnects the capacitor bank from the power source. A brief harmless current surge is supplied to the welding electrodes. This suffices for actuation of the safety circuit.

According to another feature of the invention, the safety and monitor circuits include relays serving as switching means. The relays permit ready and relatively low cost connection between the safety and monitor circuits as well as connections between these two circuits and other switching means of the stud welding machine.

According to another feature of the invention, the switching devices of the safety and monitor circuits include controllable semi-conductor components such as transistors, thyristors, or the like. These components provide special wear resistance and are advantageous where particular importance is attached to achieving special wear resistance of the switching devices.

These and other features of the invention are pointed out in the claims. Other objects and advantages of the invention will become evident from the following detailed description when read in line with the accompanying drawings.

DETAILED DESCRIPTION OF PREFERRED EMBODIMENTS

Figure 1A:
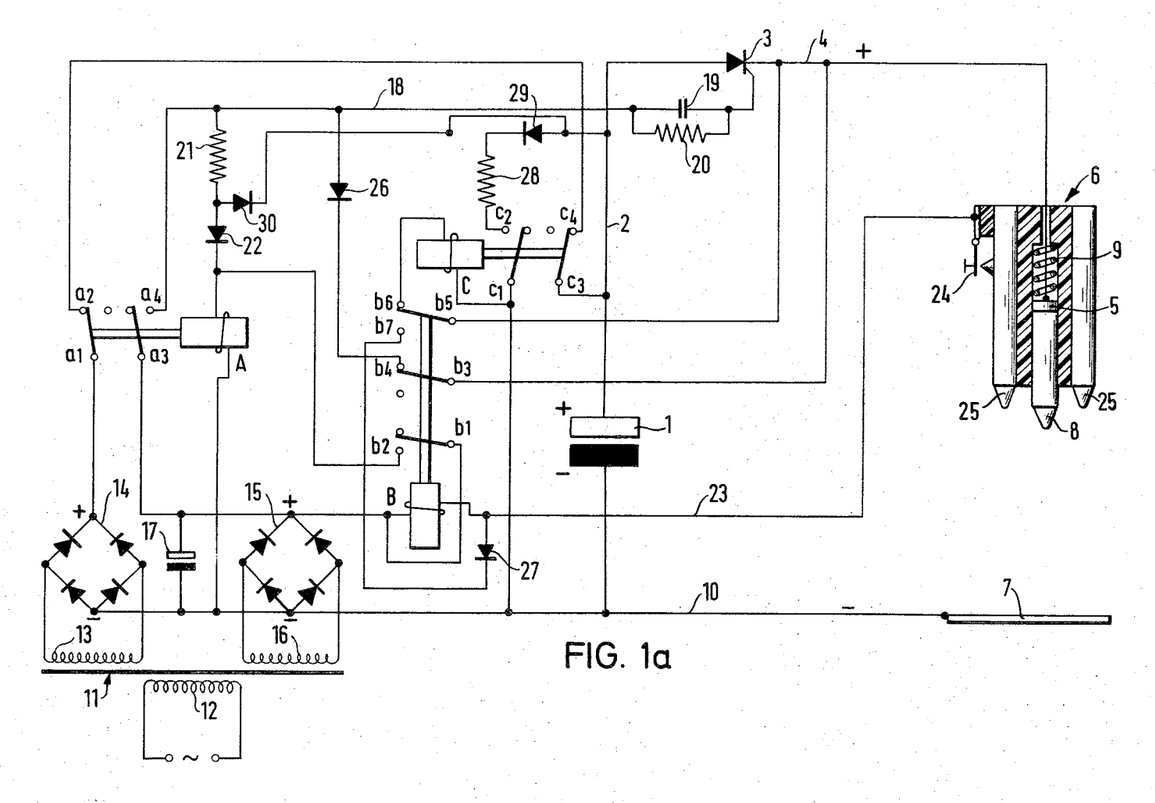
FIGS. 1a, 1b, 1c, and 1d represent schematic wiring diagrams of a stud welding machine having a monitor circuit and embodying features of the invention, the machine being shown in different operating states.

In the stud welding machine of FIGS. 1a, 1b, 1c and 1d, a capacitor battery or bank 1 stores the electrical energy required for the welding cycle. A line 2 connects the capacitor bank 1 with the anode of a thyristor 3 that forms the welding current switch. The cathode of the thyristor 3 is connected with an electrode 5 in a welding gun 6. The bolt or stud 8 to be secured by welding to a workpiece 7 electrically contacts the electrode 5 in FIGS. 1a to 1c. The line 4, the electrode 5 and the stud 8 are arranged in the welding gun 6 insulated from other components. FIG. 1a shows relay contacts in the state which they assume with unenergized relay coils.

A spring 9 elastically and yieldingly keeps the electrode 5 and the welding bolt 8 in a position in which the welding bolt 8 projects from the front end of the welding gun 6.

The workpiece 7 is composed of electrically conductive material. A line 10 electrically connects the other terminal of the capacitor bank 1 to the workpiece 7.

A transformer 11 whose primary winding 12 is supplied with alternating current from a line serves as a power source for the stud welding machine. A secondary winding 13 of the transformer 11 supplies a bridge rectifier circuit 14. The negative terminal of the rectifier circuit 14 is connected to the line 10. The positive terminal of the rectifier circuit 14 is connected to the switch contact al of a relay A.

A second bridge rectifier circuit 15 is supplied by a second secondary winding 16 of the transformer 11. Between the positive and negative terminals of the rectifier circuit 15 there is a smoothing or filter capacitor 17. The negative terminal of the rectifier circuit 15 is likewise connected with the line 10. The positive terminal of the rectifier circuit 15 is connected with a switching contact $a3$ of the relay A. The latter affects a stationary contact $a4$ connected to the control electrode of the thyristor 3 via a line 18 and a capacitor 19 and resistor 20 connected in parallel. The line 18 and the negative terminal of the rectifier circuit 15 are joined by a series connection with a resistor 21, a diode 22, and the relay A. The diode 22 is polarized in such a way as to permit passage of current from the line 18 to the negative terminal of the rectifier circuit 15.

A relay B and a line 23 connect the positive terminal of the rectifier circuit 15 with one of the contacts of a manual switch 24 on the welding gun 6. The other contact of the manual switch 24 is connected with legs 25 for the placement of the welding gun 6 onto the workpiece 7.

The positive terminal of the rectifier circuit 15 is also connected with the switch contact $b1$ of the relay B. The latter affects a stationary contact $b2$ of the relay B which is connected in turn with the link between the diode 22 and the relay A.

The line 4 is connected with a switch contact $b3$ of the relay B which coacts with a stationary contact $b4$ of the relay B connected via a diode 26 with the line 18. The diode 26 is polarized in such a way that it permits current to pass from the line 18 to the line 4. The line 4 is further connected with a switch contact $b5$ of the relay B which coacts with two stationary contacts $b6$ and $b7$ of the relay B. The contact $b7$ is connected via a diode 27 with the line 23 in such a way as to allow current to pass from the line 23 to the contact $b7$. The contact $b6$ is connected via the relay C with the negative terminal of the rectifier circuit 16 which is also connected with the switch contact $c1$ of the relay C. The switch contact $c1$ coacts with a stationary contact $c2$ connected with the line 2 via a resistor 28 and a diode 29. The polarity of diode 29 allows current to pass from the line 2 to the contact $c2$. The point between the resistor 21 and the diode 22 is connected by a diode 30 with the line 2. The polarity of diode 30 allows current to pass from the resistor 21 to the resistor 28.

In the state of the circuit illustrated in FIG. 1$a$, the capacitor battery is charged by the secondary winding 13 of the transformer 11 via the rectifier circuit 14, the closed contacts $a1 - a2$ of the relay A and the closed contacts $c3 - c4$ of the relay C.

The following exclusively concerns the mode of operation of the safety and discharge circuits of the bolt welding machine circuit illustrated in FIG. 1$a$.

As long as the thyristor 3 is not turned on, it disconnects the positive side of the capacitor bank 1 from the line 4. Thus, there is no voltage between the line 4 and the line 10. Contact between the welding bolt 8 and the workpiece 7 is therefore harmless as long as the thyristor 3 is not turned on.

The thyristor 3 can be turned on only by the energizing of the two relays A and B. However, these two relays can be energized by the manual switch 24 only the moment the welding gun 9 with its legs 25 is positioned on the workpiece 7, i.e., the moment the welding gun 6 is in operational readiness. Therefore, hazardous contact with the welding bolt 8 is not possible.

Following a welding cycle, if the thyristor 3 remained conductive as a result of a defect, a voltage would be produced between the two lines 4 and 10 upon charging of the capacitor bank 1. A current would pass through the connection of the line 4 through the contacts $b5 - b6$ of the relay B, the coil of the relay C, to the line 10. If the voltage between the lines 4 and 10 and therefore, across the relay coil of the relay C corresponds to or exceeds a predetermined, harmless value (for instance 12 volts) the relay C closes its contacts $c1 - c2$ and opens its contacts $c3 - c4$. Opening of the contacts $c3 - c4$, interrupts the current supplied to the capacitor bank 1. As a result of the closed contacts $c1 - c2$, the capacitor battery 1 discharges spontaneously through the diode 29 and the very small discharge resistance 28. If the voltage of the capacitor bank 1 has dropped beneath the holding value of the relay C, its contacts $c1 - c2$ and $c3 - c4$ return into their original positions. The capacitor bank 1 is thereby again supplied with current. It recharges once again until the relay C attains its triggering voltage, in order to discharge itself once again following the triggering of the relay C until it has attained its hold voltage, and repeats these cycles. The voltage of the capacitor bank 1 and, therefore, the voltage between the lines 4 and 10 thus remains far below a hazardous level.

However, interruption of the current supplied to the capacitor bank 1 by the contacts $c3 — c4$, as well as the discharging of the capacitor bank 1 through the resistor 28 can take place only if the link from the line 4 via the contacts $b5 - b6$ is assured via the relay coil C to the line 10 and, therefore, the relay C itself is operative.

In the case of a defect of the described safety and discharge circuit it is therefore possible for a hazardous voltage to occur between the two lines 4 and 10 and, therefore, between the welding electrodes.

The following refers to FIGS. 1$a$ to 1$d$ and describes the mode of operation of the circuit of the bolt welding machine, including the monitor circuit for the safety and discharge circuits.

In the circuit condition of the bolt welding machine illustrated in FIG. 1$a$, the three relays A, B and C are shown de-energized. The capacitor battery 1 is being charged via the secondary winding 13 of the transformer 11, the rectifier circuit 14, the closed contacts $a1$ and $a2$ as well as $c3$ and $c4$. The thyristor 3 is blocked, so that there is no voltage between the welding bolts 8 and the base metal 7. In this condition, contact between the welding bolt 8 and the base metal 7 is therefore harmless.

FIG. 1$b$ illustrates the condition of the switches in the circuit of the bolt welding machine of FIG. 1$a$ the moment the welding gun 6 has been placed on the workpiece 7 and the manual switch 24 is closed.

Figure 1B:
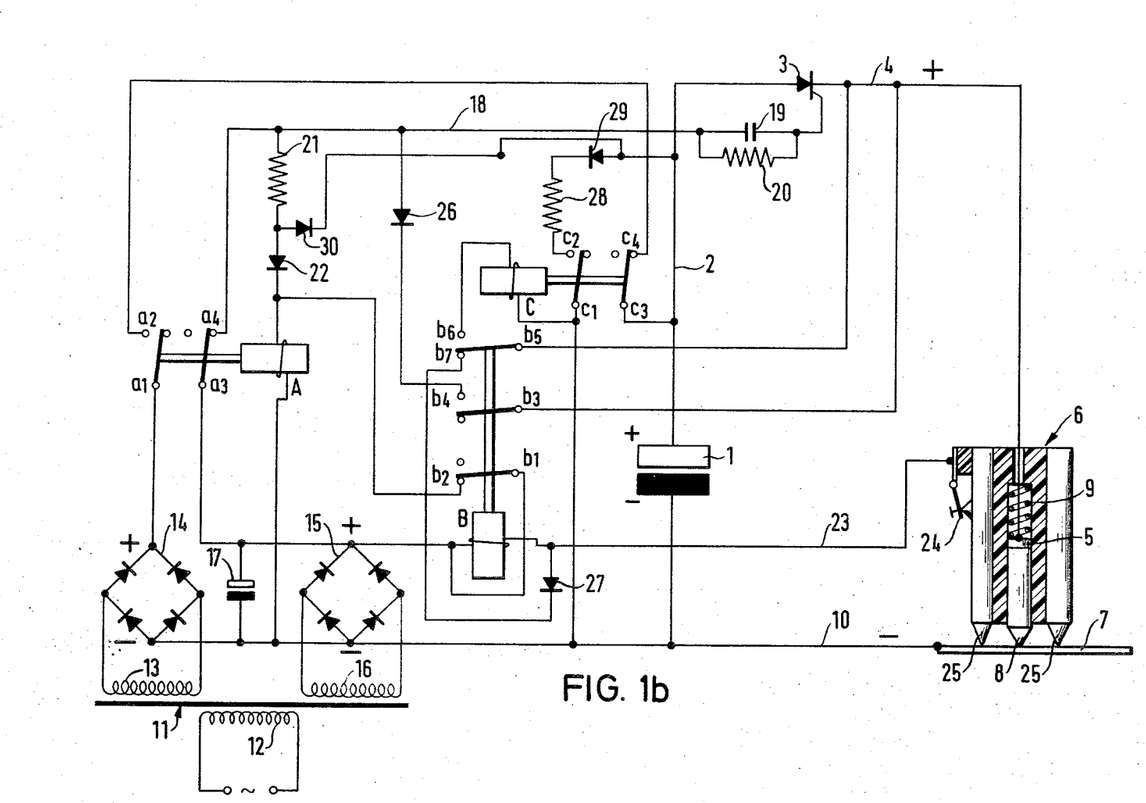

The moment the welding gun 6 has been placed with its legs 25 firmly on the workpiece 7, the spring 9 forces the electrode 5 to push the welding bolt 8 against the workpiece 7. Closing of the manual switch 24 causes closing of the circuit with the secondary winding 16 of the transformer 11, the rectifier circuit 15, the coil of the relay B, the line 23, the manual switch 24, one leg 25 of the welding gun 6, the workpiece 7 and the line 10 from the workpiece to the negative terminal of the rectifier circuit 15. The relay B now opens its contacts $b5 - b6$, $b3 - b4$ and closes its contacts $b5 - b7$, $b1 - b2$.

The closed contacts $b1 - b2$ pass a current from the positive terminal of the rectifier circuit 15 through the coil of the relay A to the negative terminal of the rectifier circuit 15. The relay A thereby opens its contacts $a1 - a2$ and closes its contacts $a3 - a4$. As a result of the opening of the contacts $a1 - a2$, the rectifier circuit 14 is cut off from the capacitor battery 1. Closing of the contacts $a3 - a4$ causes the rectifier circuit 15 to transmit a brief current surge via the capacitor 19 to the control electrode of the thyristor 3. This actuates the thyristor. The resistance of the resistor 20 is very high and serves only for discharging the capacitor 19.

The capacitor bank 1 now discharges through the bolt 8 to be welded and the workpiece 7 thereby performing the welding operation.

The diode 22 prevents the triggering of the thyristor 3 through resistor 21 from occurring when the contacts $b1 - b2$ of the relay B close.

Figure 1C:
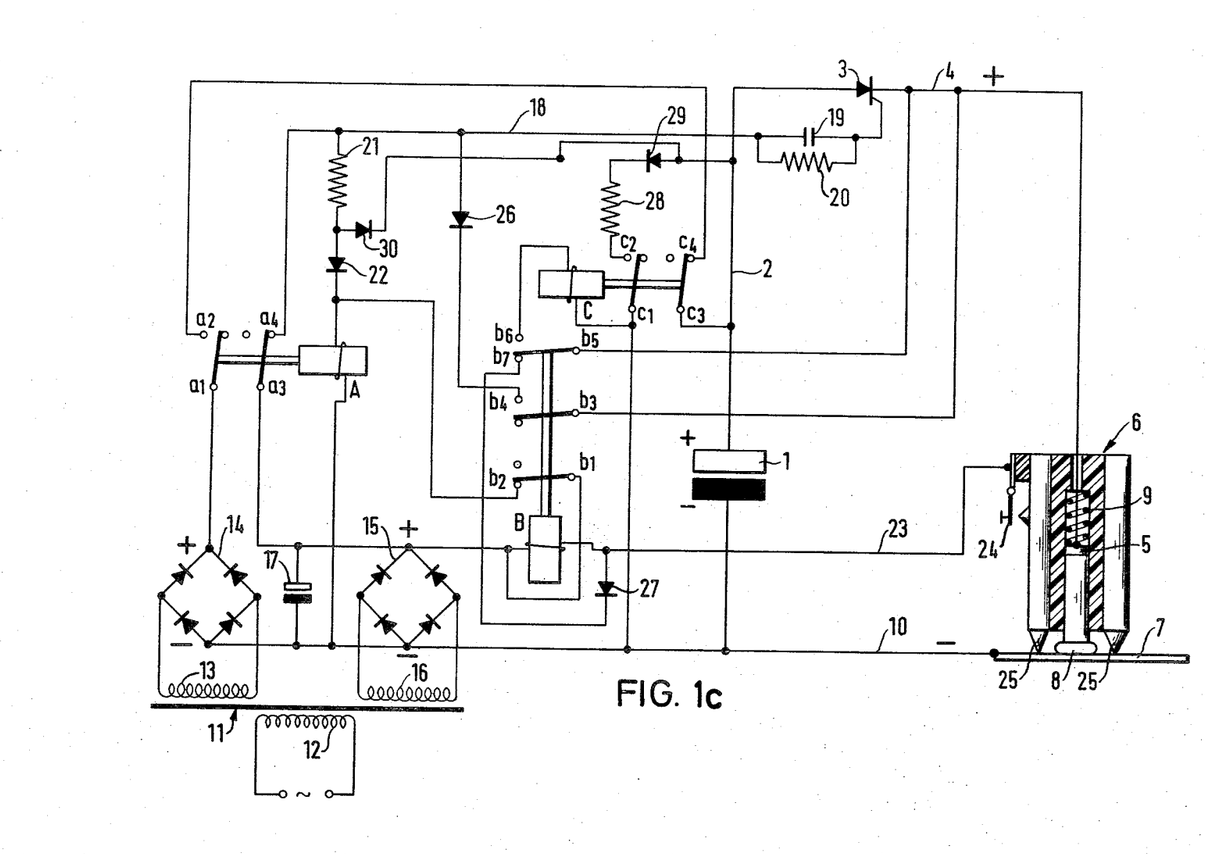

FIG. 1c illustrates the condition of the switches in the circuit of the bolt welding machine right after the manual switch 24 is opened. Initially, the positions of the contacts in the relays A and B remain as shown in FIG. 1b. The relay B is latched by a maintenance circuit composed of the diode 27, the closed contacts $b5 - b7$ of the line 4, the welding bolt 8, the workpiece 7, and the line from the workpiece and the negative terminal of the rectifier circuit 15. The relay A is latched by a maintenance circuit composed of closed contacts $a3 - a4$, the resistor 21, the diode 22, and the coil of the relay A.

Figure 1D:
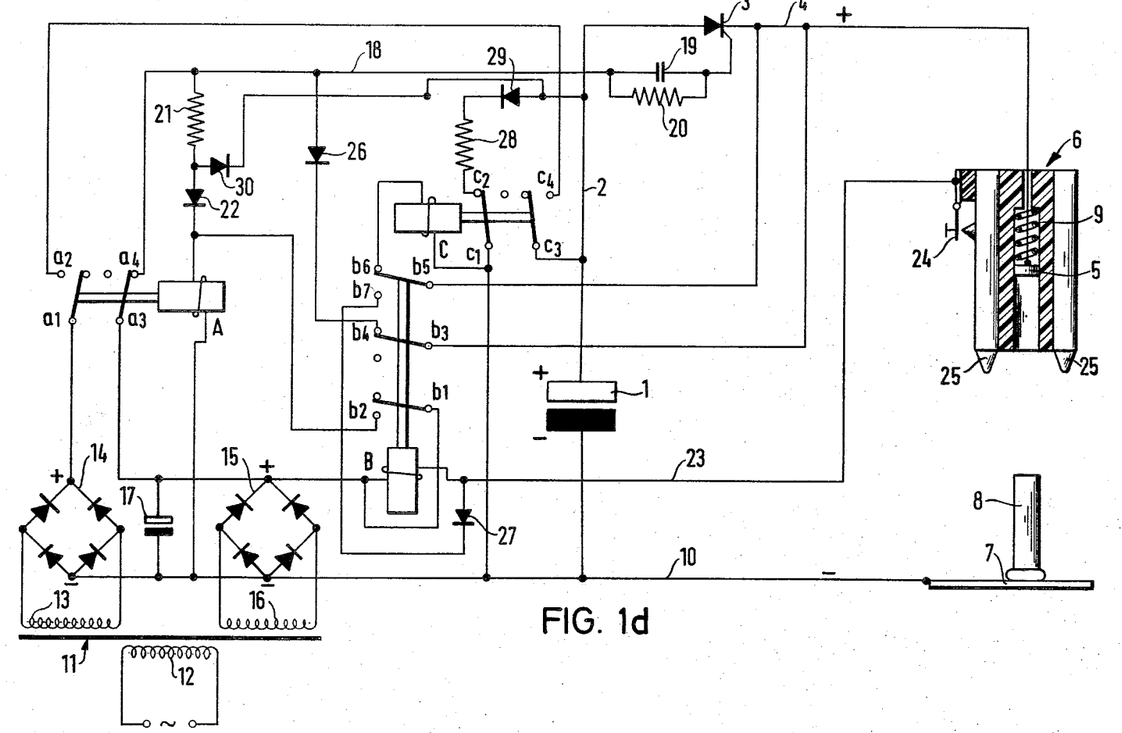

FIG. 1d illustrates the condition of the switches in the circuit of the bolt welding machine following the removal of the welding gun 6 from the welded bolt 8.

The moment the welding gun 6 is removed from the welded bolt 8, the current flow through the relay B is interrupted. As a result, the relay B opens its contacts $b1 - b2$, $b5 - b7$ and closes its contacts $b3 - b4$ and $b5 - b6$. For the time being, the flow of current through the relay A continues through the maintenance circuit described.

However, at the same time, a current passes from the rectifier circuit 15 through the closed contacts $a3 - a4$, the diode 26, and the closed contacts $b4 - b3$ to the line 4, and from there over the closed contacts $b5 - b6$ through the coil of the relay C. As a result, the relay C opens its contacts $c3 - c4$ and closes its contacts $c1 - c2$ thereby connecting the safety and discharge circuit. The current, hitherto passing through the relay A, still passes through the resistor 21 but now passes through the discharge resistor 28 which has a very low resistance level. As a result, the voltage across the relay A drops beneath its holding value, thereby closing the contacts $a1 - a2$ and opening the contacts $a3 - a4$. Through the opening of the contacts $a3 - a4$, the flow of current via the diode 26 to the relay C is interrupted so that the relay C again returns to its rest position. It therefore opens the contacts $c1 - c2$ and closes the contacts $c3 - c4$ so that the charging of the capacitor battery 1 is re-initiated.

Opening of the latching circuit of the relay A and hence recharging of the capacitor battery 1 following a welding operation thus occurs only as a result of a brief actuation of the safety and discharge circuit. If, as a result of defect, the safety and discharge circuit fails to be triggered, the relay A remains in its operating state and prevents a charging of the capacitor bank 1.

A drawback of the bolt welding machine in accordance with FIGS. 1a to 1d resides in the fact that if the relay is in its operating position in the safety and the discharge circuit on account of a defect, it de-energizes when the bolt welding machine is disconnected from the supply line. As a result, it returns into its rest position. Only one welding operation would be possible after each time the stud welding machine is disconnected because the defect in the safety and discharge circuit 1 would cause the relay A to remain in its operating condition and prevent recharging of the capacitor battery 1. While the attention of the operator would thereby be drawn to the fact that the bolt welding machine is defective, the operator may nevertheless have been exposed to hazards before his attention was drawn to the defect in the bolt welding machine.

Figure 2:
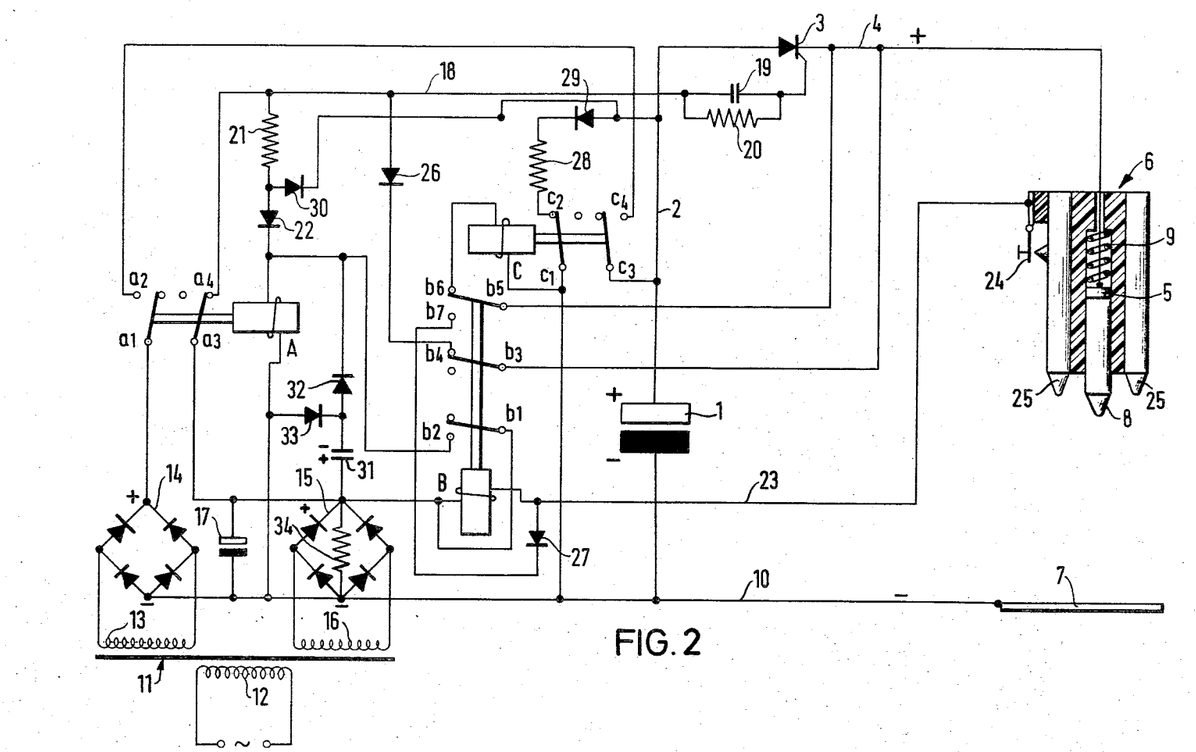
FIG. 2 is a schematic diagram of another capacitor discharge welding apparatus having a monitor circuit and embodying features of the invention.

FIG. 2 illustrates a circuit of a stud welding machine similar to the circuit illustrated in FIGS. 1a to 1d. However, this machine effectively prevents recharging of the capacitor bank 1 during a defect in the safety discharge circuit. The circuit of FIG. 2 accomplishes this even when the bolt welding machine is disconnected from and subsequently reconnected to the line supply.

The circuit in FIG. 2 includes all of the circuit components of FIGS. 1a to 1d. It further includes the series circuit composed of the capacitor 31 connected to the positive terminal of the rectifier circuit 15 and a diode 32 connected to the point joining the diode 22 and the relay A.

The diode 32 is poled for easy current flow from the capacitor 31 to the relay A.

Another diode 33 extending from the connection between the relay A and the negative terminal of the rectifier 15 to the connection between the capacitor 31 and the diode 32 is poled to oppose current flow from capacitor 31 to the negative terminal of the rectifier circuit 15. A resistor 34 extends between the positive terminal and the negative terminal of the rectifier 15.

In operation, the capacitor bank 1 exhibits a zero voltage at the moment the stud welding machine is connected to the supply line. However, the operating voltages of the rectifier circuits 14 and 15 and across the smoothing capacitor 17 are present for all practical purposes. The capacitor 31 charges through the diode 32 and the relay A. This charging current energizes the relay A which opens its contact $a1 - a2$. These open contacts block the current supply to the capacitor bank 1. At the same time, the contact $a3 - a4$ are closed. As a result, the resistor 21 and diode 22 maintain a supply of current to the relay A for the time being. Furthermore, a current from the rectifier circuit 15 passes through the closed contact $a3 - a4$ through a diode 26, through the closed contact $b4 - b3$ to the line 4. From there the current passes through the closed contact $b5 - b6$ and through the relay C. As previously described in connection with FIG. 1d, the the relay C triggers the safety and discharge circuit. As a result of this, the voltage across the relay A drops its holding value. Its contact $a1 - a2$ close again and its contact $a3 - a4$ open again. Opening of the contact $a3 - a4$ interrupts the supply of current to the relay C. The relay C opens its contact $c1 - c2$ and closes its contact $c3 - c4$ thereby initiating charging of capacitor bank 1.

Were the relay C to fail to render the safety and discharge circuit operative as the result of some defect, the relay A would remain in its operative condition so that charging of capacitor bank 1 would be impossible.

In the course of this cycle, the capacitor 31 charges substantially to the triggering voltage of the relay A. This triggering voltage is smaller than the voltage of the rectifier circuit 15. Discharging of the load through the resistor 34 and diode 33 is therefore impossible as long as the auxiliary current source exhibits a voltage. If the relay B is energized by actuation of the manual switch 24, the diode 32 prevents discharge of the load via the closed contact b1 - b2. Therefore, the voltage across the capacitor 31 is preserved as long as the rectifier circuit 15 exhibits a voltage.

However, if the stud welding machine is disconnected from the supply line, thereby causing the voltage in the rectifier circuit 15 to become zero, the capacitor 31 discharges through the resistor 34 and the diode 33. If the stud welding machine is reconnected, the capacitor 31 recharges through the relay A thereby actuating it. The switching cycles previously described in detail follow thereafter.

Upon charging of the capacitor 31 the diode 33 blocks the direct path to the negative terminal of the rectifier circuit 15. This permits charging current to flow over the relay A.

According to another embodiment of the invention, the relays A, B and C with their contacts, as shown in FIGS. 1a - 1d and 2 are replaced entirely or partly with electronic switching devices such as transistors, thyristors and the like.

While embodiments of the invention have been described in detail, it will be obvious to those skilled in the art that the invention may be embodied otherwise without departing from its spirit and scope.

What is claimed is:

1. A capacitor discharge stud welding apparatus for connection to a power source, comprising capacitor bank means for storing energy, said capacitor bank means being connectable to the power source, a welding current switch, welding electrodes, a triggering circuit, a safety circuit, conductive means including said welding current switch for forming a welding circuit from the capacitor bank to the welding electrodes, means including said triggering circuit for cutting the power source off from the capacitor bank means and for actuating the closing of the welding current switch, means including said safety circuit, said last named means acting in response to the existence of a voltage between the welding electrodes higher than a pre-determined voltage when the welding current switch is not actuated by the triggering circuit said means including said safety circuit when actuated discharging the capacitor bank means and cutting it off from the power source, means including a monitor circuit responding to a condition during welding and causing said safety circuit to be actuated, said means including said monitor circuit permitting recharge of the capacitor bank to a given maximum voltage having a non-hazardous voltage level as long as the safety circuit does not become operative following its actuation, said means including said safety circuit coacting with said means including said monitor circuit so that after the safety circuit is actuated the safety circuit allows the monitor circuit to return to its rest position, said means including said safety circuit responding to the return of the monitor circuit to its rest position, said means including said safety circuit responding to the existence between the welding electrodes of a voltage higher than a pre-determined value by remaining in its operating position even after the monitor circuit returns to its rest position.

2. An apparatus as in claim 1, wherein said means including said monitor circuit prevents recharging of said capacitor bank in response to its actuation and in response to said safety circuit being unactuated.

3. An apparatus as in claim 1, wherein said means including said monitor circuit responds to each flow of welding current through said welding electrodes and actuates said monitor circuit.

4. An apparatus as in claim 3, wherein said means including said monitor circuit includes means responsive to separation of the welding electrodes from each other.

5. An apparatus as in claim 3, wherein said welding electrodes include a welding gun and a base metal, and wherein said means including said monitoring circuit includes means responsive to lifting of the welding gun from the base metal after a welding cycle for actuating said monitor circuit.

6. An apparatus as in claim 1, wherein said means including said monitor circuit includes means responsive to discharging of said capacitor bank for actuating said monitor circuit prior to every recharging of the capacitor bank.

7. An apparatus as in claim 1, wherein said means including said monitor circuit includes sensing means responsive to initial application of power by said source to said means including said monitor circuit for actuating said monitor circuit.

8. An apparatus as in claim 7, wherein said sensing means includes a capacitor for triggering the monitor circuit, said capacitor being charged upon application of power from said power source, said means including said monitor circuit responding to said charging current to said capacitor.

9. An apparatus as in claim 1, wherein the means including said monitor circuit includes means for cutting power from the capacitor bank from the moment of its actuation until operation of the safety circuit.

10. An apparatus as in claim 1, wherein said triggering circuit includes a bistable switch element coupled to the welding current switch for triggering the welding current switch and for cutting the power source from the capacitor bank, said triggering element being responsive to a first pulse for triggering closing of the welding current switch and cutting the power source from the capacitor bank, and being responsive to a second pulse in resuming its original state, said triggering circuit generating said first pulse and actuation of said safety circuit generating said second pulse.

11. A stud welding apparatus as in claim 9, wherein said means including said safety circuit includes pulse generating means responsive to the system being connected to the supply line for automatically transmitting a first pulse in the form of a current surge, said means including said safety circuit including a bistable element responsive to the first pulse for triggering the welding current switch and cutting the capacitor bank off from the power source while causing a brief harmless current surge to be supplied to the welding electrodes.

12. An apparatus as in claim 1, wherein said means including said safety circuit and said means including said monitor circuit include relay switching devices.

13. An apparatus as in claim 1, wherein said means including said safety circuit and said means including said monitor circuit have a plurality of controllable semiconductor components serving as switching elements.

14. An apparatus as in claim 1, wherein said means including said monitor circuit includes means for manually actuating said monitor circuit.

* * * * *